(12) United States Patent
Uchino et al.

(10) Patent No.: US 9,948,433 B2
(45) Date of Patent: Apr. 17, 2018

(54) USER EQUIPMENT AND BASE STATION

(71) Applicant: NTT DOCOMO, INC., Tokyo (JP)

(72) Inventors: Tooru Uchino, Tokyo (JP); Kazuki Takeda, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/313,566

(22) PCT Filed: Feb. 23, 2016

(86) PCT No.: PCT/JP2016/055154
§ 371 (c)(1),
(2) Date: Nov. 23, 2016

(87) PCT Pub. No.: WO2016/158087
PCT Pub. Date: Oct. 6, 2016

(65) Prior Publication Data
US 2017/0195088 A1  Jul. 6, 2017

(30) Foreign Application Priority Data
Apr. 3, 2015  (JP) .................. 2015-076549

(51) Int. Cl.
*H04W 4/00* (2009.01)
*H04L 1/18* (2006.01)
*H04W 72/04* (2009.01)

(52) U.S. Cl.
CPC ....... *H04L 1/1861* (2013.01); *H04W 72/0413* (2013.01); *H04W 72/0446* (2013.01)

(58) Field of Classification Search
None
See application file for complete search history.

(56) References Cited

U.S. PATENT DOCUMENTS 8,687,508 B2  4/2014  Marinier et al.
8,942,190 B2  1/2015  McBeath et al.
(Continued)

FOREIGN PATENT DOCUMENTS

JP  2010-502107 A  1/2010
JP  2012-521158     9/2012

OTHER PUBLICATIONS

International Search Report issued in corresponding application No. PCT/JP2016/055154 dated May 24, 2016 (4 pages).
(Continued)

*Primary Examiner* — Otis L Thompson, Jr.
(74) *Attorney, Agent, or Firm* — Osha Liang LLP

(57) ABSTRACT

Techniques for controlling HARQ processes in uplink communication to implement low latency communication are disclosed. One aspect of the present invention relates to user equipment, comprising: a transmission and reception unit configured to transmit and receive radio signals to/from a base station; and an HARQ process control unit configured to control multiple HARQ processes for uplink communication with the base station, wherein the HARQ process control unit asynchronously transmits uplink data from the multiple HARQ processes to the base station in accordance with a predetermined transmission method allowing the base station to identify a transmitting HARQ process of received uplink data.

13 Claims, 11 Drawing Sheets

(56) References Cited

U.S. PATENT DOCUMENTS

| | | | |
|---|---|---|---|
| 2008/0298387 A1* | 12/2008 | Lohr | H04L 1/1671 370/467 |
| 2014/0029552 A1* | 1/2014 | Lv | H04L 1/1887 370/329 |
| 2014/0078941 A1* | 3/2014 | Seo | H04L 1/1822 370/280 |
| 2014/0153529 A1 | 6/2014 | Marinier et al. | |
| 2014/0241318 A1* | 8/2014 | Zhong | H04W 74/0833 370/331 |
| 2014/0362832 A1* | 12/2014 | Rudolf | H04L 1/1822 370/336 |
| 2015/0043508 A1 | 2/2015 | McBeath et al. | |
| 2015/0055589 A1* | 2/2015 | Yerramalli | H04L 1/1861 370/329 |
| 2015/0172030 A1* | 6/2015 | Tiirola | H04L 1/1854 370/280 |
| 2017/0099121 A1* | 4/2017 | Uchino | H04L 1/1887 |
| 2017/0163388 A1* | 6/2017 | Wiemann | H04L 1/1861 |
| 2017/0188345 A1* | 6/2017 | Wengerter | H04W 72/042 |

OTHER PUBLICATIONS

Written Opinion of the International Searching Authority issued in corresponding application No. PCT/JP2016/055154 dated May 24, 2016 (3 pages).

3GPP TS 36.321 V12.4.0, "3rd Generation Partnership Project; Technical Specification Group Radio Access Network; Evolved Universal Terrestrial Radio Access (E-UTRA); Medium Access Control (MAC) protocol specification (Release 12)"; Dec. 2014 (60 pages).

Potevio, "On HARQ issues for TDD UL-DL reconfiguration"; 3GPP TSG RAN WG1 Meeting #74, R1-133562; Barcelona, Spain; Aug. 19-23, 2013 (3 pages).

Office Action issued in the counterpart Japanese Patent Application No: 2016-565079, dated Oct. 3, 2017 (5 pages).

* cited by examiner

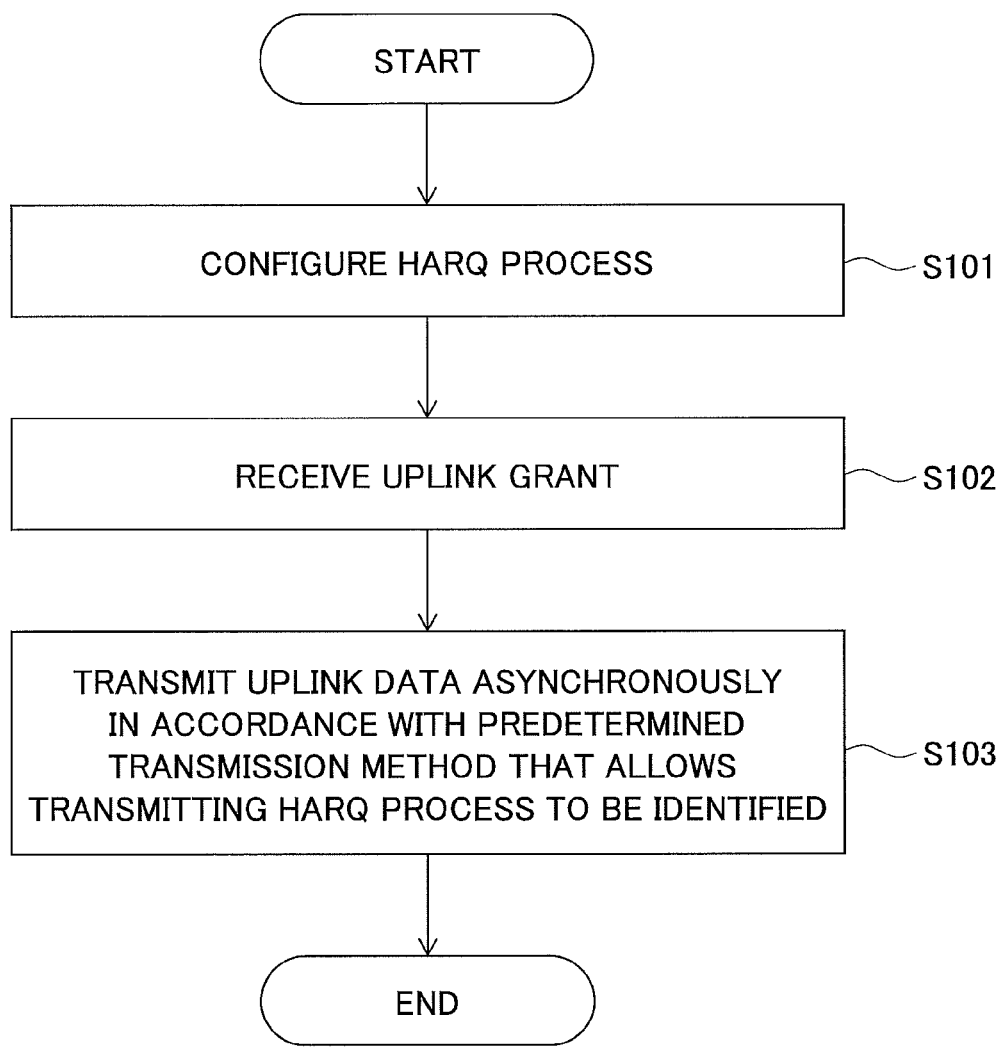

USER EQUIPMENT AND BASE STATION

TECHNICAL FIELD

The present invention relates to a radio communication system.

BACKGROUND ART

In LTE (Long Term Evolution) systems, a high throughput can be achieved through fast retransmission using an HARQ (Hybrid Automatic Repeat Request). The HARQ is performed in a MAC (Medium Access Control) layer, and in LTE standard, the number of HARQ processes managed at user equipment (UE) and a base station (evolved NodeB: eNB) is determined depending on cell duplex modes and so on. Also, if carrier aggregation is configured, an HARQ entity is configured for each cell or component carrier (CC) as illustrated in FIG. 1, and the respective HARQ entities maintain multiple HARQ processes.

In transmission and reception operations between user equipment and a base station, data is processed on a per HARQ process basis identified by an HARQ process number. Typically, asynchronous transmission is used in downlink communication, and the base station can transmit data from the HARQ processes at arbitrary timings as long as the timings are separated longer than a predetermined period (for example, 8 ms in FDD (Frequency Division Duplex)) from the previous transmission of the HARQ processes. Meanwhile, synchronous transmission is used in uplink communication, and the user equipment retransmits data from the HARQ processes at a predetermined cycle (8 ms) as illustrated in FIG. 2. Specifically, as illustrated, upon receiving an uplink grant from the base station, for example, the user equipment starts the HARQ process #0 to transmit uplink data from the respective HARQ processes #1 to #7. Typically, the HARQ process number is uniquely determined at the initial transmission timing of a PUSCH (Physical Uplink Shared Channel) and is not explicitly indicated to the base station.

According to the LTE standard, a transport block (TB) is decoded in accordance with a decoding procedure as illustrated in FIG. 3. First, upon receiving the transport block, at step S11, the MAC layer confirms the HARQ process number of the transport block and determines whether the transport block has been newly transmitted or retransmitted. If the transport block has been newly transmitted, the MAC layer decodes the transport block at step S12 and determines whether the decoding result is successful at step S13. If the decoding result is successful, the MAC layer forwards the decoding result to a disassembly and demultiplexing entity at step S14 and transmits an ACK at step S15. On the other hand, if the decoding result is not successful at step S13, the MAC layer stores data attempted for decoding in a soft buffer at step S16 and transmits a NACK at step S17.

On the other hand, if the transport block has been retransmitted at step S11, at step S18, the MAC layer determines whether the transport block has been successfully decoded before. If the transport block has been successfully decoded before, at step S19, the MAC layer transmits the ACK. On the other hand, if the transport block has not been successfully decoded before, at step S20, the MAC layer combines the transport block with data in the soft buffer. The MAC layer decodes the combined transport block at step S21 and determines whether the decoding result is successful at step S22. If the decoding result is successful, at step S19, the MAC layer transmits the ACK. On the other hand, if the decoding result is not successful, the MAC layer stores data attempted for decoding at step S23 and transmits the NACK at step S24.

In the fifth generation (5G) communication, three typical use cases as illustrated in FIG. 4 are assumed. Specifically, the three use cases are a use case where mobile broadband is further developed, a use case such as IoT (Internet of Things) where everything is connected to networks and a use case where highly reliable and ultra-low latency communication is achieved.

PRIOR ART DOCUMENT

Non-Patent Document

Non-Patent Document 1: 3GPP TS 36.321 V12.4.0 (2014-12)

SUMMARY OF INVENTION

Problem to be Solved by the Invention

In this manner, one requirement of the 5G communication is the highly reliable and ultra-low latency communication. Conventionally, significantly delayed data transmission and reception have been avoided by prioritizing scheduling for services having a strict latency requirement such as an audio service over other logical channels and user equipments. However, incases where radio quality is insufficient and/or where a cell is congested, even if the priority of the services is increased in the cell, an effect of the latency reduction may be limited.

Also, as illustrated in the left side in FIG. 5, it is considered that retransmission from the RLC layer may be made faster. However, an RTT (Round Trip Time) at the RLC layer is tens of milliseconds, and the latency reduction effect may be limited. In addition, as illustrated in the right side in FIG. 5, it is discussed to achieve low latency with diversity effect through MAC transmission at multiple carriers. According to the MAC transmission using the multiple carriers, even in the case where data transmission has failed in one cell, if the data transmission is successful in the other cell, the low latency communication can be achieved.

In uplink communication, on the other hand, uplink data is synchronously transmitted from the HARQ process as stated above, and the transmission timing arrives cyclically. Also, TTI (Transmission Time Interval) bundling is defined in the synchronous transmission, and it is considered that data is successively transmitted from the same HARQ process in subframes of the indicated bundling number. However, the bundling number is statically determined in the current LTE standard and cannot be configured dynamically depending on communication states. In this manner, the HARQ transmission cannot be flexibly controlled in the uplink communication, and it is difficult to implement the low latency communication.

In light of the above-stated problem, an object of the present invention is to provide techniques for controlling the HARQ process in the uplink communication to implement the low latency communication.

Means for Solving the Problem

In order to achieve the above object, one aspect of the present invention relates to user equipment, comprising: a transmission and reception unit configured to transmit and receive radio signals to/from a base station; and an HARQ process control unit configured to control multiple HARQ processes for uplink communication with the base station, wherein the HARQ process control unit asynchronously transmits uplink data from the multiple HARQ processes to the base station in accordance with a predetermined transmission method allowing the base station to identify a transmitting HARQ process of received uplink data.

Another aspect of the present invention relates to a base station, comprising: a communication control unit configured to control radio communication with user equipment; and an uplink data processing unit configured to process uplink data asynchronously transmitted from multiple HARQ processes in the user equipment, wherein the uplink data processing unit processes uplink data transmitted from the multiple HARQ processes in accordance with a predetermined transmission method allowing the base station to identify a transmitting HARQ process of received uplink data.

Advantage of the Invention

According to the present invention, the techniques for controlling the HARQ process in the uplink communication to implement the low latency communication can be provided.

BRIEF DESCRIPTION OF DRAWINGS

FIG. 11 is a flowchart for illustrating an uplink transmission method by the user equipment according to one embodiment of the present invention.

EMBODIMENTS OF THE INVENTION

Embodiments of the present invention are described below with reference to the drawings.

In embodiments below, user equipment for asynchronously transmitting uplink data from multiple HARQ processes is disclosed. Summarizing the embodiment as stated below, asynchronous transmission is applied instead of synchronous transmission used in conventional uplink communication. The user equipment transmits uplink data from the respective HARQ processes to a base station in accordance with a transmission method allowing the base station to identify the transmitting HARQ process of received uplink data. For example, as the transmission method where the base station can identify the transmitting HARQ process, i) the user equipment may transmit uplink data from only an identical HARQ process in a predetermined period; ii) the user equipment may indicate an HARQ process number of the transmitting HARQ process of to-be-transmitted uplink data to the base station; or iii) the user equipment may transmit uplink data of the HARQ process indicated by the base station.

Figure 1:
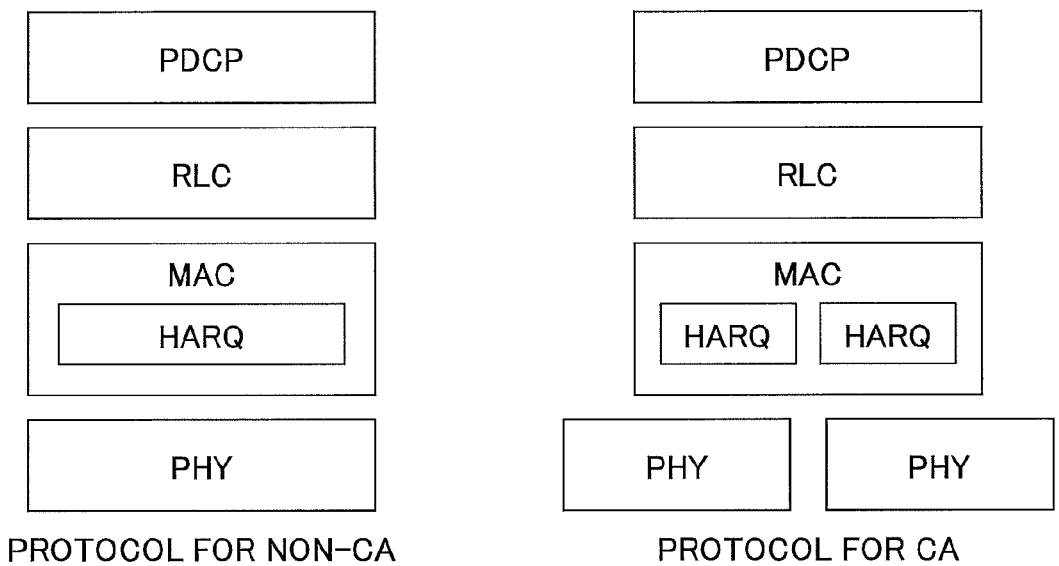
FIG. 1 is a schematic diagram for illustrating HARQ processes in execution of carrier aggregation.
Figure 2:
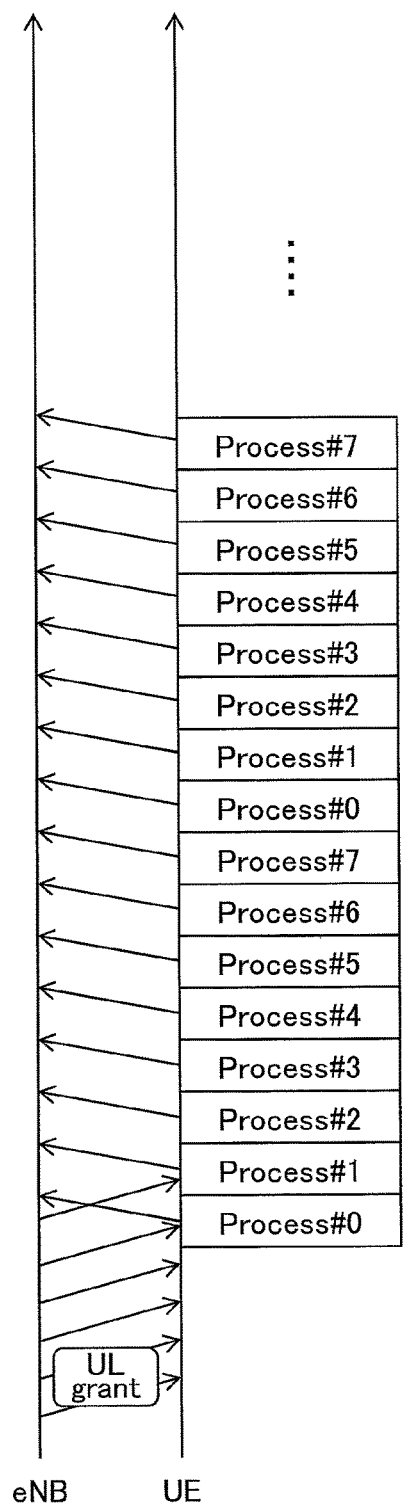
FIG. 2 is a schematic diagram for illustrating uplink transmission timings of conventional HARQ processes.
Figure 3:
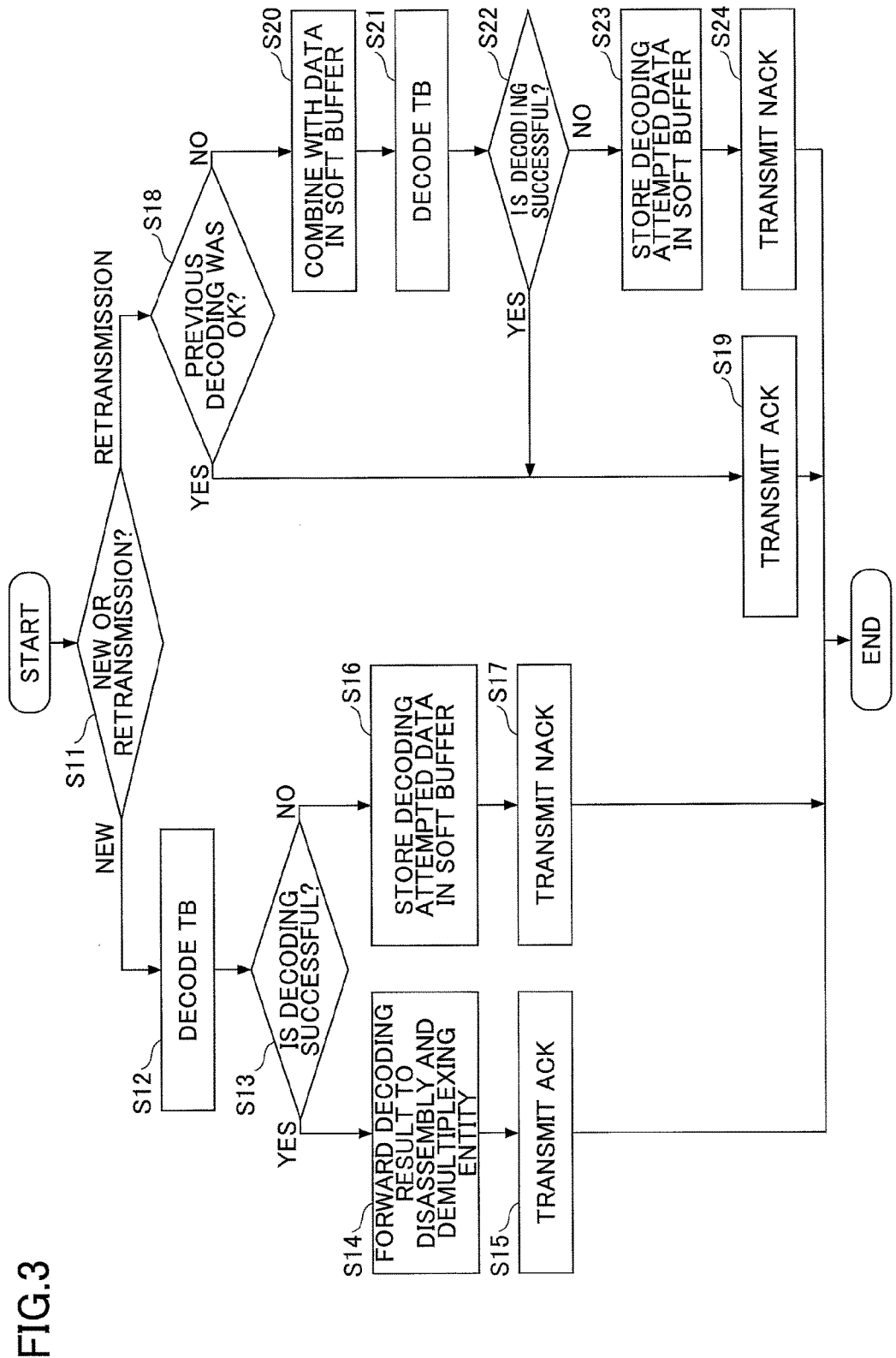
FIG. 3 is a flowchart for illustrating a transport block decoding procedure.
Figure 4:
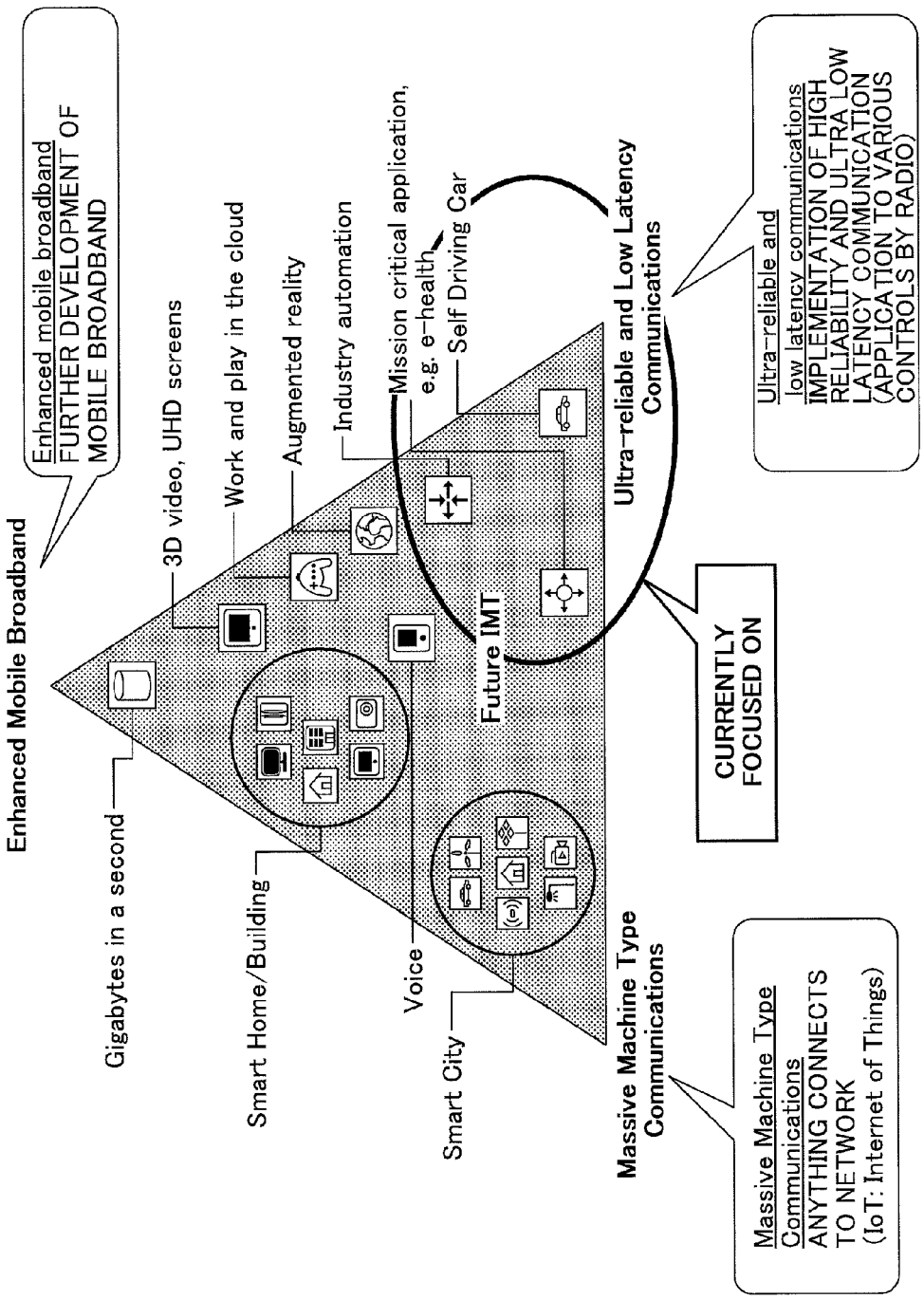
FIG. 4 is a schematic diagram for illustrating typical use cases of the 5G communication.
Figure 5:
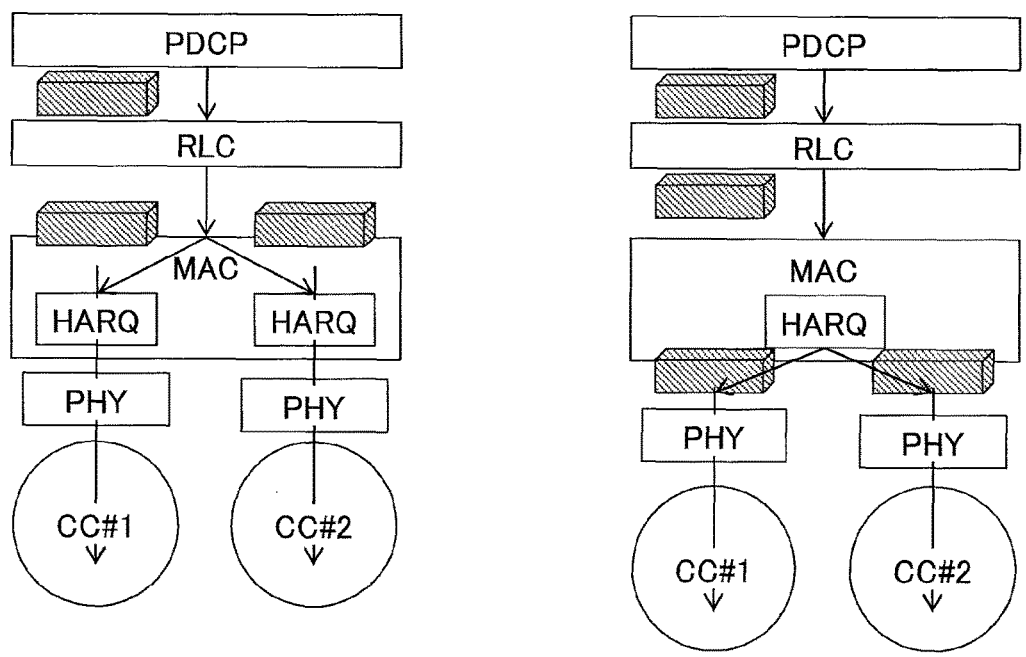
FIG. 5 is a schematic diagram for illustrating a protocol for HARQ processes in execution of the carrier aggregation.
Figure 6A:
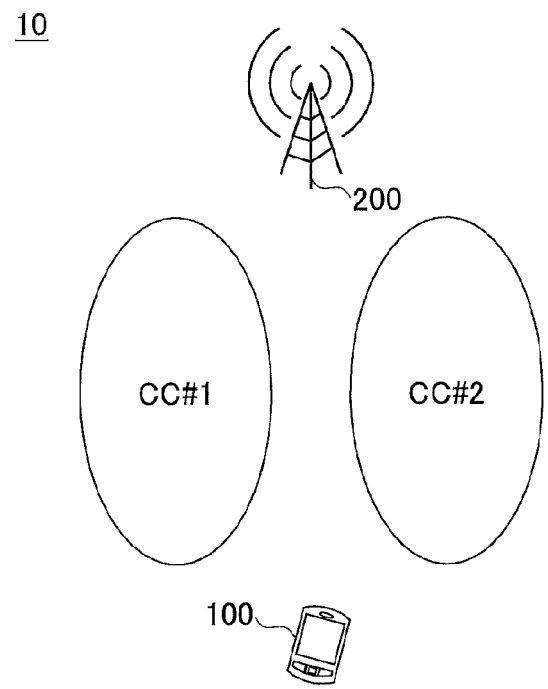
FIG. 6A is a schematic diagram for illustrating a radio communication system according to one embodiment of the present invention.

A radio communication system according to one embodiment of the present invention is described with reference to FIG. 6A. FIG. 6A is a schematic diagram for illustrating a radio communication system according to one embodiment of the present invention.

As illustrated in FIG. 6A, a radio communication system 10 has user equipment 100 and a base station 200. For example, the radio communication system 10 may be an LTE system or an LTE-Advanced system supporting carrier aggregation. Specifically, as illustrated, the user equipment 100 can use multiple component carriers CC#1 and CC#2 simultaneously to transmit and receive radio signals to/from the base station 200. In the illustrated embodiment, it is illustrated that the user equipment 200 performs carrier aggregation communication with the single base station 200, but the present invention is not limited to it. For example, the user equipment 100 may use component carriers served by multiple base stations 200 simultaneously to perform transmission and reception to/from the multiple base stations 200 simultaneously (dual connectivity). Also in the illustrated embodiment, only the single base station 200 is illustrated, but a large number of base stations 200 are disposed to cover a service area of the radio communication system 10.

Figure 6B:
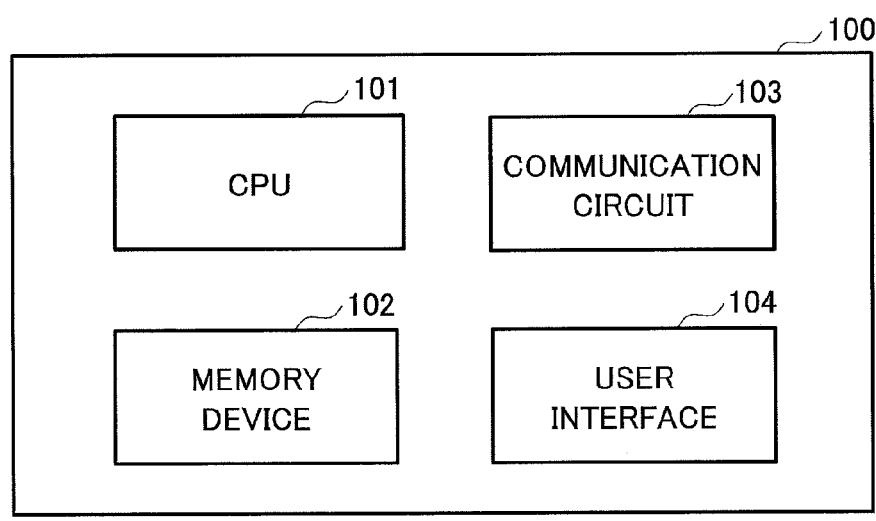
FIG. 6B is a block diagram for illustrating a hardware arrangement of user equipment according to one embodiment of the present invention.

The user equipment 100 has a carrier aggregation function to use multiple carriers served by the base stations 200 simultaneously to transmit and receive radio signals to/from the base station 200. Typically, as illustrated, the user equipment 100 may be any appropriate information processing device with a radio communication function such as a smartphone, a mobile phone, a tablet, a mobile router and a wearable terminal. As illustrated in FIG. 6B, the user equipment 100 is arranged with a CPU (Central Processing Unit) 101 such as a processor, a memory device 102 such as a RAM (Random Access Memory) and a flash memory, a radio communication device 103 for transmitting and receiving radio signals to/from the base station 200, a user interface 104 such as an input/output device and a peripheral device and so on. For example, functions and operations of the user equipment 100 as stated below may be implemented by the CPU 101 processing and running data and programs stored in the memory device 102. However, the user equipment 100 is not limited to the above-stated hardware configuration and may be arranged with circuits for implementing one or more of operations as stated below.

The base station 200 establishes a radio connection to the user equipment 100 to transmit downlink (DL) packets received from an upper station or a server communicatively connected on a core network (not shown) to the user equipment 100 as well as transmit uplink (UL) packets received from the user equipment 100 to the server. The base station 200 has a carrier aggregation function to transmit and receive radio signals to/from the user equipment 100 via multiple carriers simultaneously.

Figure 6C:
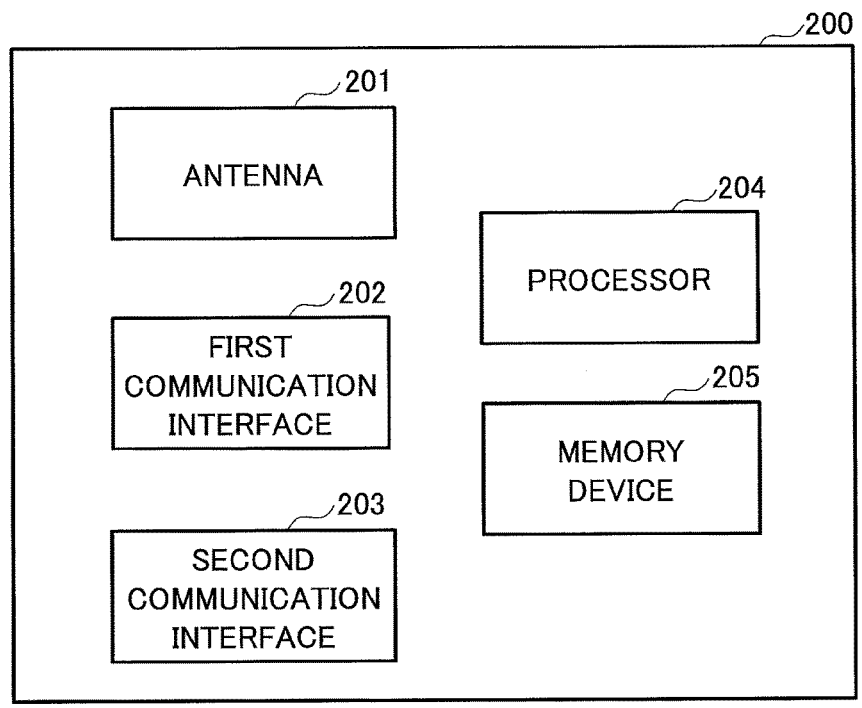
FIG. 6C is a block diagram for illustrating a hardware arrangement of a base station according to one embodiment of the present invention.

As illustrated in FIG. 6C, the base station 200 is typically arranged with hardware resources such as an antenna 201 for transmitting and receiving radio signals to/from the user equipment 100, a first communication interface 202 (for example, an X2 interface) for communicating with an adjacent base station 200, a second communication interface 203 (for example, an S1 interface) for communicating with the core network, a processor 204 and a circuit for processing signals transmitted and received to/from the user equipment 100 and a memory device 205. Functions and operations of the base station 200 as stated below may be implemented by the processor 204 processing and running data and programs stored in the memory device 205. However, the base station 200 is not limited to the above-stated hardware configuration and may have any other appropriate hardware configuration.

Figure 7:
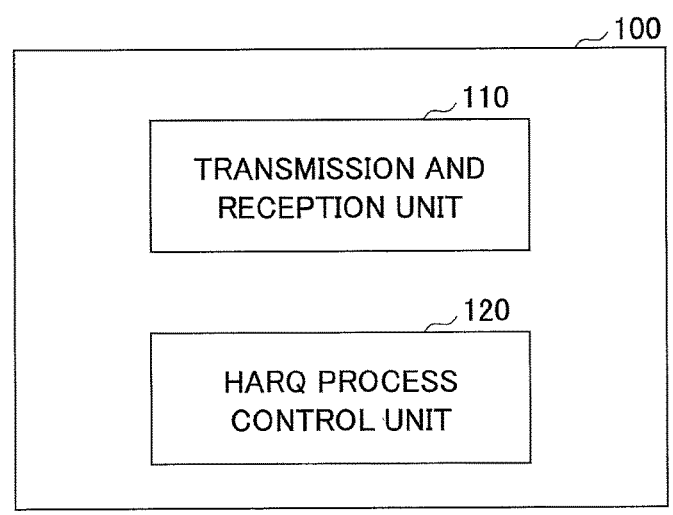
FIG. 7 is a block diagram for illustrating an arrangement of the user equipment according to one embodiment of the present invention.

Next, the user equipment according to one embodiment of the present invention is described with reference to FIGS. 7-9. FIG. 7 is a block diagram for illustrating an arrangement of the user equipment according to one embodiment of the present invention.

As illustrated in FIG. 7, the user equipment 100 has a transmission and reception unit 110 and an HARQ process control unit 120.

The transmission and reception unit 110 transmits and receives radio signals to/from the base station 200. Specifically, in downlink communication, the transmission and reception unit 110 receives various downlink channels from the base station 200 such as a downlink control channel (PDCCH (Physical Downlink Control Channel)) and a downlink data channel (PDSCH (Physical Downlink Shared Channel)). On the other hand, in uplink communication, the transmission and reception unit 110 transmits various uplink channels to the base station 200 such as an uplink control channel (PUCCH (Physical Uplink Control Channel)) and an uplink data channel (PUSCH (Physical Uplink Shared Channel)).

Also, the transmission and reception unit 110 can perform carrier aggregation where multiple carriers served by the base station 200 are used simultaneously to transmit and receive various radio channels. In the carrier aggregation, a highly reliable primary cell (PCell) for ensuring connectivity to the user equipment 100 and a secondary cell (SCell) additionally configured for the user equipment 100 during connection to the primary cell are configured.

The HARQ process control unit 120 controls multiple HARQ processes for uplink communication with the base station 200 and asynchronously transmits uplink data from the multiple HARQ processes to the base station 200 in accordance with a predetermined transmission method allowing the base station 200 to identify the transmitting HARQ process of received uplink data. Specifically, the HARQ process control unit 120 configures a number of HARQ processes determined depending on cell duplex modes or the like. In order to implement the uplink communication with the base station 200 with the asynchronous transmission, as described in detail below, the HARQ process control unit 120 uses any transmission method allowing the base station 200 to identify the transmitting HARQ process of received uplink data to transmit the uplink data from the multiple HARQ processes. As a result, the uplink data is transmitted at arbitrary timings from arbitrary HARQ processes, and the base station 200 accordingly can identify the transmitting HARQ process of the received uplink data in the asynchronous transmission where the base station 200 cannot identify the transmitting HARQ process of the received uplink data.

In one embodiment, the HARQ process control unit 120 may configure HARQ sharing for managing the multiple HARQ processes configured for component carriers in carrier aggregation communication with the base station 200 as a common HARQ process. Specifically, in the HARQ sharing, the HARQ process control unit 120 can manage multiple HARQ processes configured for multiple component carriers as a common HARQ process and use the multiple component carriers simultaneously to transmit the same uplink data from the common HARQ process. When the HARQ sharing is configured, the HARQ process control unit 120 may manage the indicated multiple HARQ processes among cells as a common HARQ process and transmit the same uplink data from the common HARQ process to the base station 200 via the multiple cells. For example, the configuration of the HARQ sharing may be indicated from the base station 200. Also, the HARQ sharing may be applied to all or a part of the HARQ processes. For example, if three component carriers CC#1, CC#2 and CC#3 are configured, the HARQ processes #0 to #3 may be shared between CC#1 and CC#2 and managed as a common HARQ process, and the HARQ processes #4 to #7 may be shared between CC#2 and CC#3 and managed as a common HARQ process. Upon receiving a retransmission request for the common HARQ process, the HARQ process control unit 120 retransmits uplink data from the common HARQ process via multiple component carriers. According to the HARQ sharing, the same uplink data is transmitted in the multiple carriers, and low latency can be achieved with diversity effect.

In one embodiment, the HARQ process control unit 120 may transmit uplink data from an identical HARQ process in a predetermined period. Specifically, the HARQ process control unit 120 continues transmitting uplink data from only the identical HARQ process in the predetermined period. As a result, the base station 200 can know that only the uplink data from the identical HARQ process is received in its indicated period and implicitly identify the transmitting HARQ process of the uplink data received in the period. Also, if the HARQ sharing is configured in the carrier aggregation communication, the HARQ process control unit 120 would continue transmitting the same uplink data via multiple component carriers in the predetermined period in the common HARQ process.

Here, the predetermined period may be indicated from the base station 200. Also, the predetermined period may be configured as a common value for multiple HARQ processes configured by the HARQ process control unit 120 or may be configured as individual values for the respective HARQ processes. Note that the initial timing of the predetermined period may be indicated in an uplink grant transmitted from the base station 200 or may be predetermined in a control signal from an upper layer such as an RRC/MAC layer.

In one embodiment, the HARQ process control unit 120 may configure the predetermined period in accordance with a bundling number of subframes or a TTI (Transmission Time Interval) number indicated by the base station 200.

If the predetermined period is indicated with the number of bundled subframes, the HARQ process control unit 120 bundles an indicated number of successive ones in subframes where the user equipment 100 can transmit uplink data and continues transmitting data from an identical HARQ process in the bundled subframes. For example, if the bundling number is indicated as 10 by the base station

Figure 8:
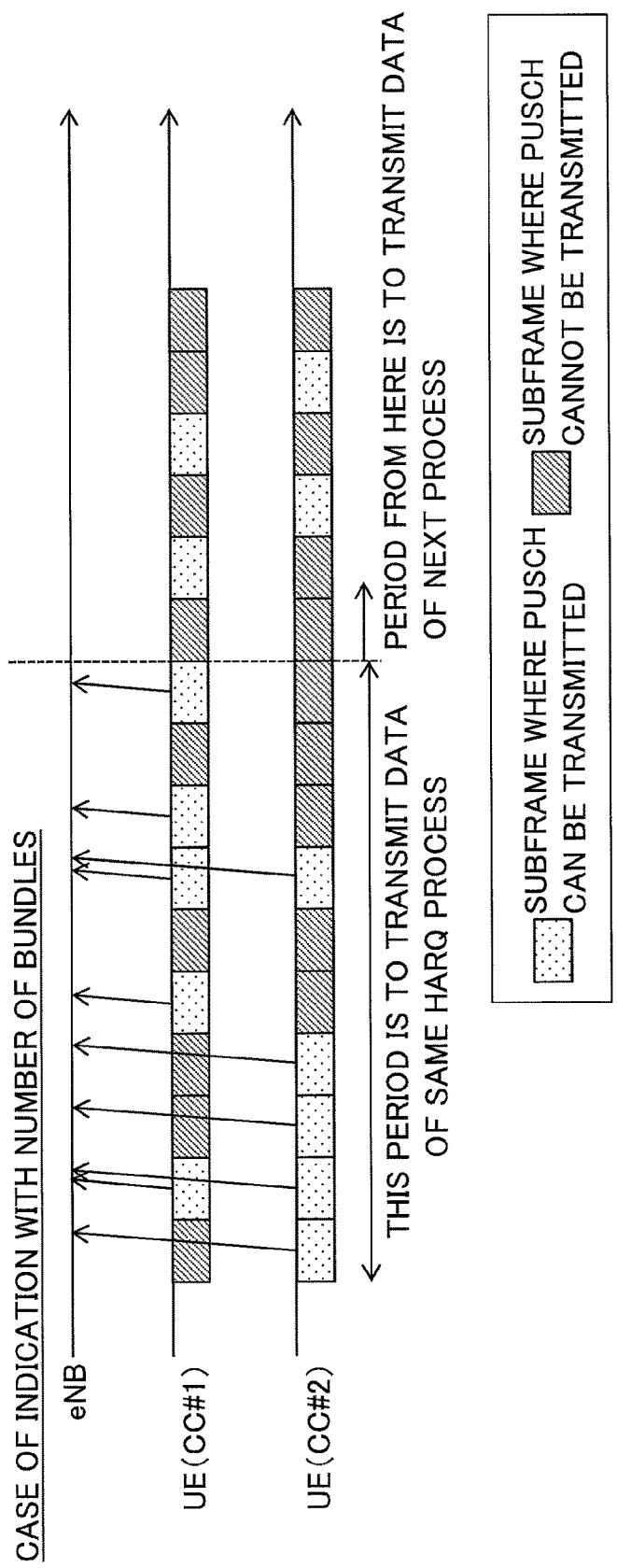
FIG. 8 is a diagram for illustrating an uplink retransmission operation of the same HARQ process indicated with a bundling number according to one embodiment of the present invention.
Figure 9:
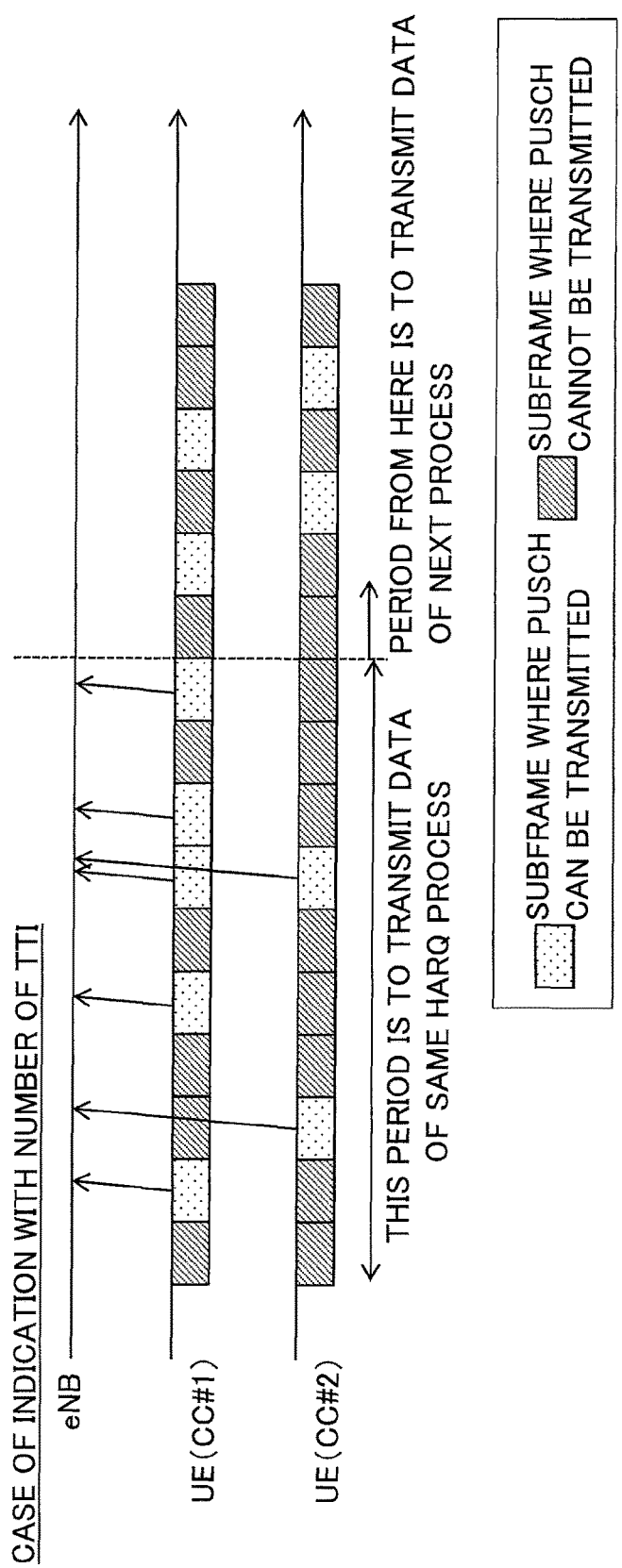
FIG. 9 is a diagram for illustrating an uplink retransmission operation of the same HARQ process indicated with a TTI number according to one embodiment of the present invention.

200, as illustrated in FIG. 8, in two component carriers configured in the carrier aggregation communication, the HARQ process control unit 120 bundles successive ten subframes for transmitting a PUSCH and continues transmitting uplink data from the same HARQ process in the subframes. Note that the period is defined with the just ten subframes in the period in the illustrated example. However, if the bundling number is set to 7 in the illustrated example, 8 subframes for transmitting the PUSCH would be included in the period defined with the 7 subframes. In this case, the HARQ process control unit 120 may transmit data in the 8 subframes. In other words, if the predetermined period is indicated with the bundling number, the HARQ process control unit 120 may configure the predetermined period with TTIs for transmitting at least the indicated bundling number of subframes. Note that subframes where uplink transmission is prohibited such as a measurement gap may be exempt from the bundling.

On the other hand, if the predetermined period is indicated with the number of TTIs, the HARQ process control unit 120 bundles subframes for transmitting uplink data in the indicated number of TTIs and continues transmitting data from an identical HARQ process in the bundled subframes. For example, if the TTI number is set to 10 by the base station 200, as illustrated in FIG. 9, in two component carriers configured in the carrier aggregation communication, the HARQ process control unit 120 bundles subframes for transmitting the PUSCH in successive 10 TTIs and continues transmitting uplink data from an identical HARQ process in the subframes.

Note that upon receiving a transmission stop indication from the base station 200 in the predetermined period, the HARQ process control unit 120 may stop transmitting uplink data from the HARQ process. In other words, upon receiving an explicit transmission stop indication from the base station 200 even in the predetermined period, the HARQ process control unit 120 may stop transmitting the uplink data from the HARQ process at this timing. For example, if the base station 200 has successfully received uplink data from the HARQ process in the middle of the predetermined period, the base station 200 may transmit the explicit transmission stop indication to the user equipment 100. The transmission stop indication may be ACK to uplink transmission from the HARQ process or a PDCCH, for example. The HARQ process control unit 120 may start to transmit uplink data of the next HARQ process immediately after stopping the transmission.

In one embodiment, the HARQ process control unit 120 may indicate an HARQ process number indicative of the transmitting HARQ process to the base station 200. Specifically, the HARQ process control unit 120 may explicitly indicate the HARQ process number of the transmitting HARQ process of asynchronously transmitted uplink data to the base station 200 to enable the base station 200 to identify the transmitting HARQ process of the received uplink data. Specifically, the HARQ process control unit 120 may indicate the HARQ process number to the base station 200 in an uplink data channel or an uplink control channel.

As one example, the HARQ process control unit 120 may use some symbols in a PUSCH for transmitting uplink data to indicate the HARQ process number. Then, the base station 200 can deliver a data portion of the decoded PUSCH to the HARQ process corresponding to the HARQ process number indicated in the PUSCH. Specifically, in SC-FDMA (Single-Carrier Frequency-Division Multiple Access) applied uplink communication, the HARQ process control unit 120 may puncture or decimate some SC-FDMA symbols in the PUSCH transmitted in the HARQ process and use the punctured symbols to indicate the HARQ process number. As one example, several symbols from the top of the PUSCH may be punctured and used to indicate the HARQ process number. In this case, the base station 200 can retrieve the HARQ process number from the received PUSCH and then decode the data portion, which can shorten buffering time of the data portion. As another example, several symbols adjacent to a DMRS (Demodulation Reference Signal) may be punctured and used to indicate the HARQ process number. In this case, the base station 200 can retrieve the HARQ process number with better quality. Also, as another example, apart from the PUSCH for transmitting uplink data, the HARQ process control unit 120 may use a PUCCH to indicate the HARQ process number. Specifically, the HARQ process control unit 120 may indicate the HARQ process number in any portion of the PUCCH.

Here, if UCI (Uplink Control Information) for indicating a CQI (Channel Quality Indicator) and/or ACK/NACK is piggybacked to the PUSCH, the UCI may be transmitted directly or dropped. Determination as to whether to transmit the UCI may be made in accordance with a predetermined condition. For example, the UCI may be dropped in initial transmission of the PUSCH and may not be dropped in subsequent transmission of the PUSCH. Alternatively, the UCI may be dropped until a predetermined number of transmissions of the PUSCH. As a result, the number of punctured bits can be reduced, which can improve decoding performance. Also, the base station 200 may indicate to the user equipment 100 whether to drop the UCI. For example, this may be indicated in the PDCCH dynamically or in an upper layer quasi-statically. As a result, the UCI can be dropped flexibly depending on communication quality or the like.

In one embodiment, the HARQ process control unit 120 may transmit uplink data for the HARQ process corresponding to the HARQ process number indicated from the base station 200. Specifically, the base station 200 may use an uplink grant for permitting the user equipment 100 to perform uplink transmission to indicate the HARQ process number of uplink data transmitted in the PUSCH from the user equipment 100, and the HARQ process control unit 120 may transmit uplink data of the HARQ process corresponding to the indicated HARQ process number in the PUSCH.

Specifically, if a predetermined function is applied, upon detecting a valid HARQ process number from the uplink grant, the HARQ process control unit 120 may asynchronously transmit uplink data of the HARQ process corresponding to the detected HARQ process number, and upon detecting an invalid HARQ process number from the uplink grant, the HARQ process control unit 120 may synchronously transmit uplink data of multiple HARQ processes. For example, if the above-stated common HARQ process is configured or if a component carrier difficult to perform synchronous transmission such as an unlicensed frequency band or a LAA (License Assisted Access) component carrier is configured, the base station 200 may indicate the HARQ process for transmitting uplink data to cause the user equipment 100 to perform asynchronous transmission. In this case, the HARQ process control unit 120 may attempt to detect the HARQ process number from the PDCCH, and if the valid HARQ process number is detected, the HARQ process control unit 120 may transmit uplink data from the HARQ process corresponding to the detected HARQ process number. On the other hand, if no valid HARQ process number is detected or if the invalid HARQ process number is detected, the HARQ process control unit 120 may determine that the base station 200 does not request to apply asynchronous transmission and perform synchronous transmission.

Also, if the HARQ process number is indicated from the base station 200, the HARQ process control unit 120 may change how to read a PHICH (Physical HARQ Indicator Channel) for indicating ACK/NACK to uplink transmission. For example, in the case where the HARQ process number is indicated from the base station 200, even if the PUSCH is transmitted, the HARQ process control unit 120 may not read the PHICH. In the conventional synchronous transmission, the user equipment 100 retransmits the PUSCH after 4 ms from receiving NACK in the PHICH. However, if the HARQ process number is explicitly indicated from the base station 200, the HARQ process control unit 120 may not retransmit the PUSCH at that timing. Alternatively, if the HARQ process number is indicated from the base station 200, the HARQ process control unit 120 may read the PHICH similar to the conventional manner and perform synchronous retransmission in response to the NACK in the PHICH in addition to asynchronous retransmission at the indicated timing. As a result, the asynchronous retransmission can be achieved while using existing retransmission control.

Also, the base station 200 may indicate the HARQ process number in a UE-specific search space in the PDCCH. Specifically, the HARQ process number is indicated to the user equipments not in a common search space in the PDCCH but in the UE-specific search space. In this case, the HARQ process control unit 120 can perform blind decoding on the PDCCH under this assumption and identify the HARQ process number. Note that the HARQ process control unit 120 may determine whether to read the subsequent PHICH depending on whether the HARQ process number is indicated in the UE-specific search space or the common search space.

Note that the above-stated explicit indication method of the HARQ process by the base station 200 may be applied singularly or in combination.

In one embodiment, the HARQ process control unit 120 may transmit uplink data from the multiple HARQ processes to the base station 200 in an ascending order of the HARQ process number, in a descending order of the number of retransmissions or in a Round Robin. In synchronous transmission, the uplink data from the multiple HARQ processes is transmitted periodically. On the other hand, in asynchronous transmission, as stated above, the HARQ process control unit 120 can autonomously determine the to-be-transmitted HARQ processes. In this case, the HARQ process control unit 120 may determine the to-be-transmitted HARQ processes in an ascending order of the HARQ process number, in a descending order of a number of retransmissions or in a Round Robin, for example.

As one example, the HARQ process control unit 120 may transmit uplink data from the respective HARQ processes until a predetermined number of times in an ascending order of the HARQ process number. Here, the predetermined number of times may be defined with the bundling number of subframes or the TTI number as stated above.

As another example, the HARQ process control unit 120 may transmit uplink data from the respective HARQ processes until a predetermined number of times in a descending order of the number of retransmissions. In this case, the HARQ process control unit 120 transmits uplink data from the HARQ processes until the predetermined number of times in the descending order of the number of retransmissions and waits for ACK to the transmitted uplink data. If the ACK is not received, the HARQ process control unit 120 may retransmit the uplink data from the HARQ process until the predetermined number of times. As a result, it is possible to avoid interruption of transmission of other HARQ processes even if the retransmission is unsuccessful.

In a still further embodiment, the HARQ process control unit 120 may transmit uplink data from the respective HARQ processes in a Round Robin for the HARQ processes until the predetermined number of times. Specifically, the HARQ process control unit 120 determines the to-be-transmitted HARQ processes in the Round Robin for the HARQ process number having to-be-transmitted uplink data whose ACK has not been received. Then, if the to-be-transmitted uplink data arises in the HARQ process that has not had to-be-transmitted uplink data, the HARQ process control unit 120 determines the to-be-transmitted HARQ process in the Round Robin including the HARQ process from this time point.

Note that if the UCI is piggybacked to a PUSCH, in the carrier aggregation communication, the HARQ process control unit 120 piggybacks the UCI to any of the PUSCHs simultaneously transmitted via multiple cells. Then, if a common HARQ process is configured, the HARQ process control unit 120 may piggyback the UCI to two or more PUSCHs. As a result, diversity effect can be obtained.

Figure 10:
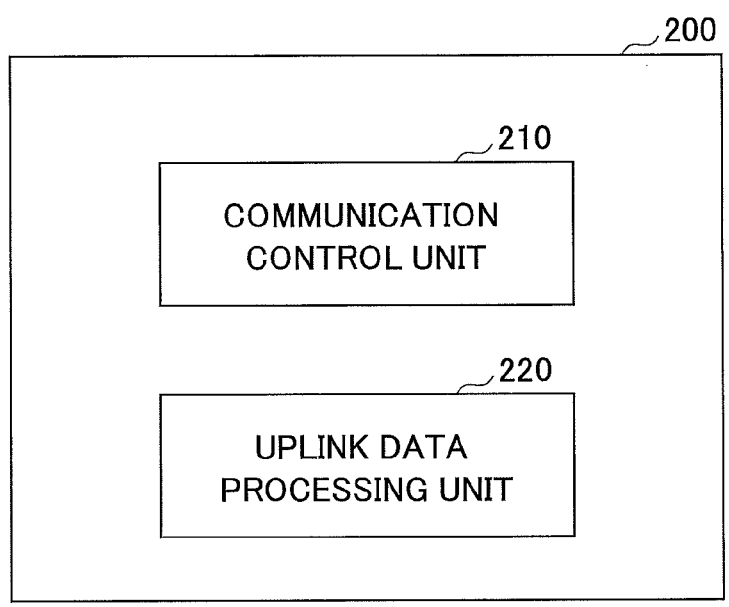
FIG. 10 is a block diagram for illustrating an arrangement of the base station according to one embodiment of the present invention.

Next, the base station according to one embodiment of the present invention is described with reference to FIG. 10. FIG. 10 is a block diagram for illustrating an arrangement of the base station according to one embodiment of the present invention.

As illustrated in FIG. 10, the base station 200 has a communication control unit 210 and an uplink data processing unit 220.

The communication control unit 210 controls radio communication with the user equipment 100. Specifically, the communication control unit 210 transmits and receives various control signals and data signals to/from the user equipment 100. Also, the communication control unit 210 configures carrier aggregation for the user equipment 100 and transmits and receives radio signals to/from the user equipment 100 via multiple component carriers. Furthermore, in carrier aggregation communication, the communication control unit 210 may configure HARQ sharing for managing multiple HARQ processes configured for the multiple component carriers as a common HARQ process for the user equipment 100. When the HARQ sharing is configured, the user equipment 100 can manage the multiple HARQ processes as the common HARQ process and use multiple component carriers simultaneously to transmit uplink data from the common HARQ process. When the communication control unit 210 transmits a retransmission request for the common HARQ process, the communication control unit 210 can receive uplink data retransmitted from the common HARQ process via the multiple component carriers. In this manner, according to the HARQ sharing, the uplink data can be transmitted from the same HARQ process in the multiple carriers, which can implement shorter latency with the diversity effect.

The uplink data processing unit 220 processes uplink data asynchronously transmitted from multiple HARQ processes in the user equipment 100 and processes the uplink data transmitted from multiple HARQ processes in accordance with a predetermined transmission method allowing the base station 200 to identify the transmitted HARQ process of the received uplink data. As stated above, in typical asynchronous uplink transmission, the base station 200 can identify the transmitting HARQ process of the received uplink data.

In this embodiment, the uplink data can be transmitted in accordance with the predetermined transmission method allowing the base station 200 to identify the transmitting HARQ process. As one example of the transmission method, the user equipment 100 may transmit uplink data from only the same HARQ process to the base station 200 in a predetermined period. As a result, the uplink data processing unit can know that the uplink data received during the predetermined period has been transmitted from the same HARQ process. As another example of the transmission method, the user equipment 100 may indicate the HARQ process number of the transmitting HARQ process of the to-be-transmitted uplink data to the base station 200. As a result, the uplink data processing unit 220 can identify the transmitting HARQ process of the received uplink data. As a still further example, the uplink data processing unit 220 may indicate the HARQ process number of the uplink grant provided HARQ process to the user equipment 100. As a result, the uplink data processing unit 220 can identify the transmitting HARQ process of the received uplink data.

Next, uplink transmission operations according to one embodiment of the present invention are described with reference to FIG. 11. FIG. 11 is a flowchart for illustrating an uplink transmission method in the user equipment according to one embodiment of the present invention.

As illustrated in FIG. 11, at step S101, the user equipment 100 configures multiple HARQ processes. For example, in carrier aggregation communication, the user equipment 100 configures HARQ entities for respective cells and configures a predetermined number of HARQ processes in the respective HARQ entities. Then, if the HARQ sharing is configured, the user equipment 100 may manage the HARQ processes indicated among the cells as a common HARQ process and transmit the same uplink data from the common HARQ process to the base station 200 via multiple cells.

At step S102, the user equipment 100 receives an uplink grant from the base station 200. Upon receiving the uplink grant, radio resources for uplink transmission are scheduled for the user equipment 100, and the uplink transmission can be performed with the radio resources.

At step S103, the user equipment 100 asynchronously transmits uplink data from multiple HARQ processes to the base station 200 in accordance with a predetermined transmission method allowing the base station 200 to identify the transmitting HARQ process of the received uplink data. In typical asynchronous uplink transmission, the base station 200 cannot identify the transmitting HARQ process of the uplink received from the user equipment 100. In this embodiment, the user equipment 100 transmits the uplink data in accordance with the predetermined transmission method allowing the base station 200 to identify the transmitting HARQ process. As one example of the transmission method, the user equipment 100 may transmit uplink data from only the same HARQ process to the base station 200 in a predetermined period. As a result, the base station 200 can know that the uplink data received in the predetermined period has been transmitted from the same HARQ process. As another example of the transmission method, the user equipment 100 may indicate the HARQ process number of the transmitting HARQ process of the to-be-transmitted uplink data to the base station 200. As a result, the base station 200 can identify the transmitting HARQ process of the received uplink data. In a still further example, the base station 200 may indicate the HARQ process number of the HARQ process, to which an uplink grant is provided, to the user equipment 100, and the user equipment 100 may transmit uplink data from the HARQ process specified in the indication. As a result, the base station 200 can identify the transmitting HARQ process of the received uplink data.

Although the embodiments of the present invention have been described in detail, the present invention is not limited to the above-stated specific embodiments, and various modifications and variations can be made within the spirit of the present invention as recited in claims.

This international patent application claims the benefit of priority based on Japanese Priority Application No. 2015-076549 filed on Apr. 3, 2015, the entire contents of which are hereby incorporated by reference.

LIST OF REFERENCE SYMBOLS

10: radio communication system
100: user equipment
110: transmission and reception unit
120: HARQ process control unit
200: base station
210: communication control unit
220: uplink data processing unit

The invention claimed is:

1. A user equipment, comprising:
a transmission and reception unit configured to transmit and receive radio signals to/from a base station; and
a Hybrid Automatic Repeat Request (HARQ) process control unit configured to control multiple HARQ processes for uplink communication with the base station,
wherein the HARQ process control unit asynchronously transmits uplink data from the multiple HARQ processes to the base station in accordance with a predetermined transmission method allowing the base station to identify a transmitting HARQ process of received uplink data, and
wherein if a predetermined function is applied, upon detecting a valid HARQ process number from an uplink grant indicated from the base station, the HARQ process control unit asynchronously transmits uplink data of the HARQ process corresponding to the detected HARQ process number, and upon detecting an invalid HARQ process number from the uplink grant, the HARQ process control unit synchronously transmits uplink data of the multiple HARQ processes.

2. The user equipment as claimed in claim 1, wherein the HARQ process control unit configures HARQ sharing for managing the multiple HARQ processes configured for component carriers in carrier aggregation communication with the base station as a common HARQ process.

3. The user equipment as claim 2, wherein the HARQ process control unit transmits uplink data from an identical HARQ process in a predetermined period.

4. The user equipment as claimed in claim 2, wherein the HARQ process control unit indicates an HARQ process number indicative of the transmitting HARQ process to the base station.

5. The user equipment as claimed in claim 2, wherein the HARQ process control unit transmits uplink data for the HARQ process corresponding to the HARQ process number indicated from the base station.

6. The user equipment as claimed in claim 2, wherein the HARQ process control unit transmits uplink data from the multiple HARQ processes to the base station in an ascending order of the HARQ process number, in a descending order of a number of retransmissions or in a Round Robin.

7. The user equipment as claim 1, wherein the HARQ process control unit transmits uplink data from an identical HARQ process in a predetermined period.

8. The user equipment as claimed in claim 7, wherein the HARQ process control unit configures the predetermined period in accordance with a bundling number of subframes or a TTI (Transmission Time Interval) number indicated by the base station.

9. The user equipment as claimed in claim 1, wherein the HARQ process control unit indicates an HARQ process number indicative of the transmitting HARQ process to the base station.

10. The user equipment as claimed in claim 9, wherein the HARQ process control unit indicates the HARQ process number to the base station in an uplink data channel or an uplink control channel.

11. The user equipment as claimed in claim 1, wherein the HARQ process control unit transmits uplink data for the HARQ process corresponding to the HARQ process number indicated from the base station.

12. The user equipment as claimed in claim 1, wherein the HARQ process control unit transmits uplink data from the multiple HARQ processes to the base station in an ascending order of the HARQ process number, in a descending order of a number of retransmissions or in a Round Robin.

13. A base station, comprising:
a communication control unit configured to control radio communication with user equipment; and
an uplink data processing unit configured to process uplink data asynchronously transmitted from multiple Hybrid Automatic Repeat Request (HARQ) processes in the user equipment,
wherein the uplink data processing unit processes uplink data transmitted from the multiple HARQ processes in accordance with a predetermined transmission method allowing the base station to identify a transmitting HARQ process of received uplink data, and
wherein if a predetermined function is applied, upon detecting a valid HARQ process number from an uplink grant indicated from the base station, the user equipment asynchronously transmits uplink data of the HARQ process corresponding to the detected HARQ process number, and upon detecting an invalid HARQ process number from the uplink grant, the user equipment synchronously transmits uplink data of the multiple HARQ processes.

* * * * *